March 1, 1949.  L. H. LOGUE  2,462,878
VIBRATING SCREEN WITH VACUUM CONTROL THEREFOR
Filed Nov. 23, 1942  3 Sheets-Sheet 1
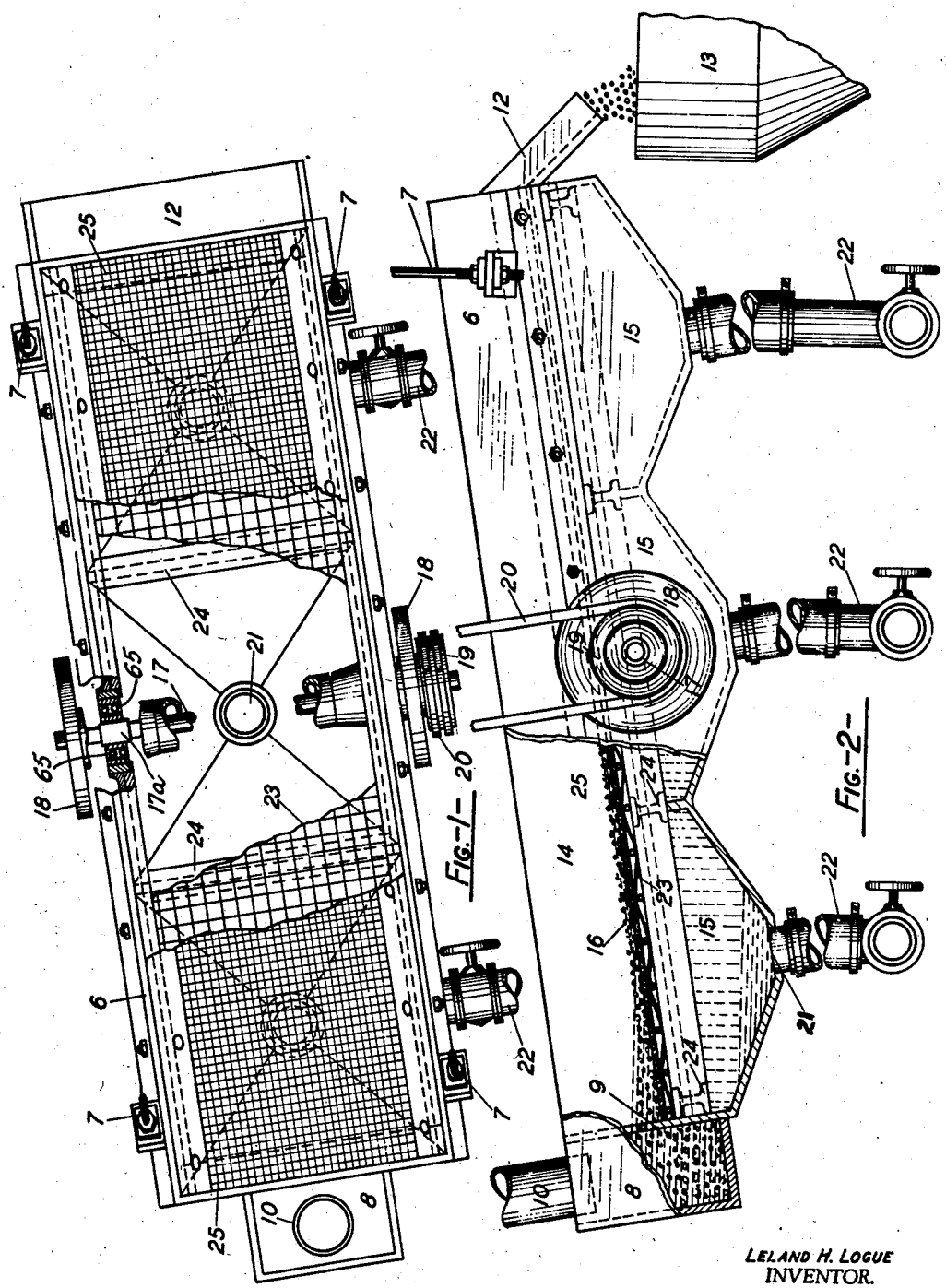
LELAND H. LOGUE
INVENTOR.
BY
ATTORNEY.

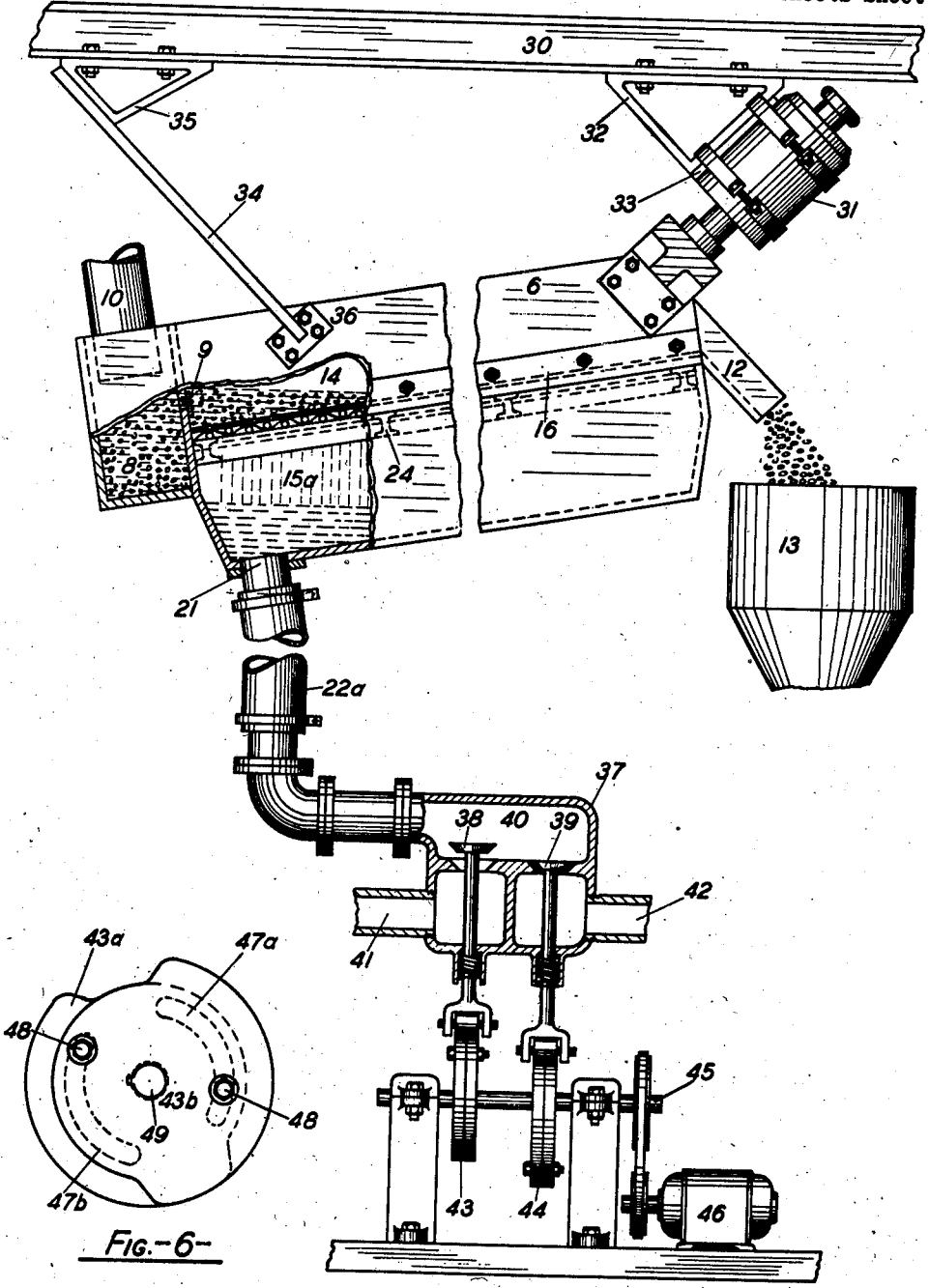

March 1, 1949.  L. H. LOGUE  2,462,878
VIBRATING SCREEN WITH VACUUM CONTROL THEREFOR
Filed Nov. 23, 1942  3 Sheets-Sheet 3
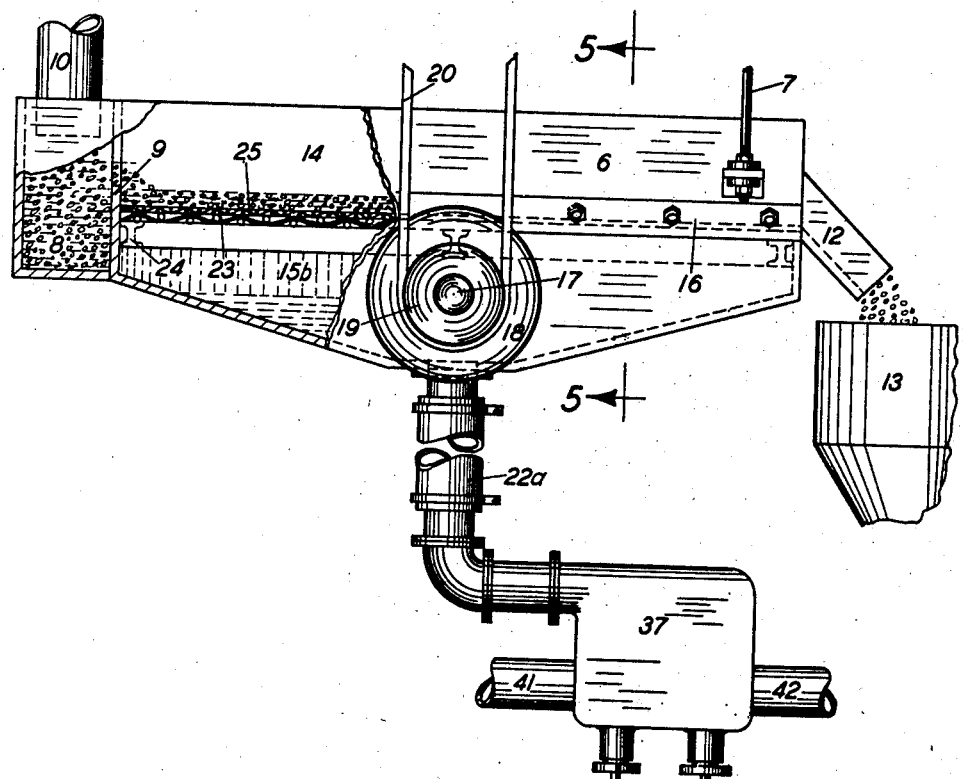
Fig.-4-
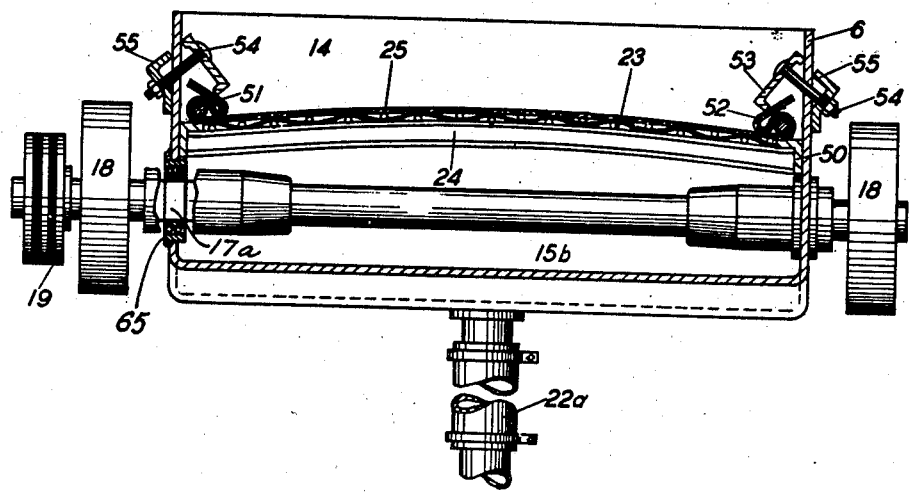
Fig.-5-
LELAND H. LOGUE
INVENTOR.
BY
ATTORNEY.

Patented Mar. 1, 1949

2,462,878

UNITED STATES PATENT OFFICE 2,462,878

VIBRATING SCREEN WITH VACUUM CONTROL THEREFOR

Leland H. Logue, Denver, Colo., assignor to Mining Process and Patent Company, Denver, Colo., a corporation of Delaware Application November 23, 1942, Serial No. 466,587

3 Claims. (Cl. 210—149)

This invention relates to the art of filtering liquids from finely divided solids and more particularly relates to methods and means for dewatering bodies of finely divided solids subject to a conveying movement.

In such a filtering action it is necessary to form a cake, preferably consisting of a unitary mass of loose solids, which are moved progressively as a unit to a point of discharge, and during said movement the adhering moisture is removed until the cake is essentially dry by the time it reaches the point of discharge.

The conveying action of such a treatment is attained most conveniently by utilizing a vibrating screen mechanism. For example, vibrating apparatus of the type disclosed in Dillon Patent No. 2,246,483 of June 17, 1941, is well suited for such purpose.

However, in the past, when attempts have been made to combine such a conveying action with forceful liquid removal, the net result has been an inadequate operation. This is particularly true in those instances where withdrawal of liquid under vacuum has been attempted in conjunction with vibratory conveying.

In the first place, such units have not provided a rigid deck which vibrated as a unit, and as a consequence secondary vibrations and harmonics were set up in the deck which prevented uniformity of movement and resulted in a breaking up of the cake with loss of impelling movement, before it could reach the discharge.

Secondly, to attain a real degree of filtering, high vacuum operation has been employed, and this has served to hold the solids on the filtering medium in opposition to the conveying action until a tight cake is formed, which blinds the screen or other media and defeats the purpose of the action.

It is an object of the present invention to provide a simple, efficient and economical vacuum filtering treatment for the removal of liquid from finely divided solids.

Another object of the invention is to provide simple, durable and efficient apparatus for conveying a wet body of finely divided solids and dewatering such solids during the conveying movement.

A further object of the invention is to provide a filtering action of a novel character which may be applied to a moving body of finely divided solids without impeding the continuity of said movement.

Other objects reside in novel details of construction and novel steps and treatments, all of which will be described specifically in the course of the following description.

The attainment of the aforesaid objects resides in the discovery that by applying different degrees of vacuum influences throughout a body of wet solids moving as a unit, an effective dewatering of the solids may be attained without impeding the impelling movement.

The novel features of the present invention may be practiced in a variety of ways and apparatus of different types may be utilized in performing the novel steps and treatments.

To afford a better understanding of the invention, reference will be made to the accompanying drawings illustrating typical embodiments of the invention. In the drawings in the several views of which like parts have been designated similarly, Figure 1 is a top plan view partially broken away to show interior parts and illustrating one embodiment of the present invention;

Figure 2 is a fragmentary side elevation, partially in section, of the apparatus illustrated in Figure 1;

Figure 3 is a fragmentary side elevation, partially in section, illustrating another embodiment of the invention;

Figure 4 is a fragmentary side elevation of still another embodiment of the present invention;

Figure 5 is a section taken along the line 5—5 of Figure 4, and drawn to an enlarged scale to illustrate features of the screen assembly utilized in the present invention; and Figure 6 is a side elevation of the cam assembly illustrated in Figure 3.

Referring first to the form of the invention illustrated in Figures 1 and 2, the vacuum filter comprises a box-like frame or container 6, preferably supported near its corners by a plurality of suspension members 7 adapted for resilient connection with a beam or other stationary support (not shown). While an overhead suspension system has been illustrated, it will be understood that where desired, an underneath suspension arrangement may be substituted therefor.

The container is provided at its lower end with a feed box 8 communicating with its interior through the provision of an overflow weir 9 located at a substantial distance above the bottom of feed box 8. Feed is introduced into feed box 8 through a suitable conduit, here shown as a discharge pipe 10.

At its opposite end the container terminates in an elevated discharge spout 12 and usually a suitable receptacle, such as a hopper 13, for example, is positioned below the chute 12 to receive matter discharged thereby. The interior of the container is divided into an upper separation chamber 14 and a plurality of lower filtrate basins 15 by a filter medium 16.

As illustrated in Figures 1 and 2, the basins 15 are of pyramidal form and are three in number, but it will be understood that a smaller or larger number of basins may be provided as required to satisfy the purposes of a given machine.

In order to provide an impelling component for solids fed onto the filter medium 16 through feed box 8 and cause their ascent to the discharge chute 12, mechanism for vibrating the screen or filter medium 16 is mounted on container 6. To this end a massive shaft 17 is suitably housed and provided with eccentric portions 17a journalled in bearings 65, in turn supported in opposite side walls of the container 6 and disposed in eccentric positions with reference to the axis of rotation of shaft 17, such as in the manner described in the said Patent No. 2,246,483.

Weighted fly wheels 18 are mounted on opposite ends of shaft 17 for conjoint rotation therewith and the shaft and fly wheel assembly is rotated at high speeds by suitable means, here shown as a sheave 19, driven by a suitable prime mover (not shown) through the intermediary of belts 20 or other suitable power transmission.

The basins 15 are provided with bottom openings 21 through which the contents of the chambers pass into flexible valve-controlled conduits 22 suitably connected with a vacuum source such as an exhaust pump (not shown).

As illustrated in Figure 2, the conduits 22 would appear to extend vertically underneath basins 15, but, in fact, as soon as the necessary clearance is provided, these conduits are bent and extend laterally of container 6 in the manner indicated in Figure 1.

In preferred practice, the filter medium 16 comprises an integral unit consisting of a coarse screen 23 welded on transversely extending supporting bars or beams 24, which are rigidly connected with the sides of container 6 as by welding. A fine mesh screen 25 is held on screen 23 in adhering relation thereto. The details of this screen assembly and the method of producing same will be described fully hereinafter.

In order to attain the desired degree of dewatering without impeding the impelling movement of solids along filter medium 16, the suction influence at the lower end of container 6 is produced by a relatively high vacuum condition in the lowermost basin 15. This is due to the fact that the incoming feed passing across weir 9 forms a pool in the lower end of container 6, as indicated by the dotted line representation, and it is necessary to exert considerable suction against this fluid body in order to form a cake which will respond to the vibration influences and ascend along screen 25.

However, as soon as the cake has been formed and its elevating movement initiated, a comparatively low vacuum condition will be sufficient to induce the desired dewatering action throughout the subsequent movement of the cake. For this reason, the succeeding basins 15 are maintained under relatively low vacuum. Further, through provision of the valve-controlled conduits 22, a selective regulation may be attained to accommodate changing conditions in the cake.

With this understanding of the structural arrangement illustrated in Figures 1 and 2, a typical treatment in such apparatus will be described to afford a better knowledge of the practice of the present invention.

A lead concentrate, for example, consisting of extremely fine crystalline solids, but with little, if any, slimes, and containing a substantial quantity of water adhering to the particle surfaces and held in the mass by entrainment, is fed through conduit 10 into feed box 8. The provision of the overflow weir 9 prevents the cascading feed from disturbing the pool and cake forming at the lower end of container 6.

While the feed is being introduced as described, the vibratory system is put into operation by rotation of shaft 17 and balance wheels 18 at very high speeds. Due to the short throw provided by the eccentric bearings and the static and dynamic balance inherent in the shaft and balance wheel arrangement, a floating, circular high-frequency vibration is attained.

This action serves to form the cake in the lower end of the container and to move same out of the pool as a relatively loose mass. After the cake once forms it remains a unitary mass moving progressively through and out of the apparatus. The aforesaid circular vibration has the effect of moving the support away from the cake, leaving it suspended for an instant until it again contacts on the upward course of the circular movement and rearwardly with respect to its point of departure.

In this way a progressive forward impetus is given to the cake and due to the high frequency of the impulses, the movement of the cake is continuous. The shaking or vibrations accelerate the gravitational descent of moisture through the loose solids and sufficient moisture collects on the bottom of the mass during each cycle of movement for removal by the vacuum action to insure substantially complete dewatering by the time a given portion of the cake reaches the discharge spout 12.

The cake upon discharge across spout 12 is essentially free from moisture and this action may be continued for long periods where conditions of continuous feed prevail. In the event changes in the cake occur, due to feed fluctuations, or changes in the composition of the material under treatment, more or less moisture may be removed from the cake as desired by suitable regulation of the valves in the several conduits 22.

Thus we see that the proper degree of vacuum is exerted on the cake in all stages of its movement from the pool to its point of discharge to insure complete and efficient dewatering. As a result, the product delivered across chute 12 into hopper 13 is essentially dry and in an ideal condition for storage, shipment, or for subsequent treatment.

While the size of the passages in the filter medium, such as screen 25 for example, initially determines the particle size of the solids which may be separated in the aforesaid action, it will be understood that the cake also functions as a filter medium preventing passage of extreme fines to the filter surface, and consequently many fine particles, which otherwise might penetrate screen 25 under the vacuum influences, remain in the cake and pass out of the treatment across discharge chute 12.

Therefore, despite the efficient and substantially complete liquid removal attained by the aforesaid operation, there is no substantial loss of extreme fines in the filtrate removal. For this reason, the present invention is valuable in treating concentrates of other separations, where the fines may constitute a very valuable product.

It will be understood that the jarring imparted to the cake in the vibratory throw squeezes moisture from the cake which deposits on the screen surface with each return of the cake thereto. Then when the cake is raised by the next throw in the vibratory action, the adhering moisture is removed therefrom by the suction influences which dry the screen or filter medium surface, leaving it in ideal condition for reception of moisture on the next return of the cake.

Because the moisture removal is effected in this way in the practice of the present invention it is unnecessary to exert any considerable amount of suction after the cake is once formed and moves out of the pool. For this reason, the basins 15 above the lowermost basin over which the pool forms are maintained under conditions of low vacuum as hereinbefore described.

Figure 3 illustrates another embodiment of the invention involving some differences in operation but utilizing substantially the same principle as that hereinbefore described. However, instead of using varying degrees of vacuum on different areas of the filter medium, the invention in this form subjects the entire filter medium surface to the same conditions of vacuum, but provides intermittent actuation which prevents blinding as might otherwise occur if the vacuum caused the cake or portions of same to adhere to such filter medium surface throughout the vibration cycle.

The intermittent action is subject to regulation varying the on and off intervals of the vacuum, and in this way a close control can be exercised over the dewatering action.

In this embodiment of the invention the container 6 is suspended at one end from a massive I-beam 30 or similar rigid support, by means of a vibrating unit 31 and a bracket 32 attached to the I-beam 30 by bolting or the like. Preferably, the vibrator 31 supports a resilient cushion member 33 where it attaches to bracket 32.

The opposite end of container 6 is supported by two rods or beams 34 which may be wood or steel, held on beam 30 by means of a bracket 35 and connected with container 6 as indicated at 36 in Figure 3. The rod or beam 34 extends at an angle of substantially 90° to the lengthwise axis of vibrator 31 to insure the proper differential vibration of the filter surface.

In this form of the invention, the interior of container 6 is divided by a filter medium 16 into an upper separation zone 14 and a lower vacuum compartment 15a. A discharge opening 21 at the lower end of compartment 15a delivers the collected liquid into a flexible conduit 22a which is connected with the control mechanism 37 of an exhaust pump or the like.

The mechanism 37 in this form of the invention is designed to subject the conduit 22a to intermittent suction influences through the provision of a plurality of valves 38 and 39 which open differentially to subject the contents of a chamber 40 communicating with conduit 22a, to the influences of a suction passage 41 and an atmospheric or low pressure air opening 42 respectively.

To attain the desired valve opening action a plurality of cams 43 and 44 are mounted on a common shaft 45 driven by a gear motor or other prime mover 46.

As illustrated in Figure 3, the cam 43 is positioned to actuate valve 38 and the cam 44 actuates valve 39. During each revolution of shaft 45, cam 43 moves valve 38 to an open position at which time valve 39 is seated. After the conduit 22a and compartment 15a have been subjected to vacuum influences in this way for a brief interval, but of sufficient duration to effectively draw off the contents of compartment 15a, the cam 43 allows valve 38 to return to its seat, while cam 44 moves valve 39 to an open position thus supplying atmospheric or low pressure air through chamber 40 to conduit 22a and compartment 15a, while they are substantially empty.

In order to provide a selective control of the vacuum interval in the operating cycle, the cams 43 and 44 are adjustable to different positions to vary the actuating interval. While any suitable means for attaining these results may be employed, a convenient arrangement has been illustrated in Figure 6. While the cam 43 has been taken for illustration, it will be understood that both the cams 43 and 44 are of similar construction and arrangement.

The cam in this form comprises two disk-like plates 43a and 43b, each having a central aperture to receive the shaft 45. The aperture 49 of plate 43a fits the shaft and this plate is keyed thereto while the plate 43a is loosely fitted on the shaft as indicated. The periphery of each plate 43a and 43b is of irregular contour, substantially 180° of which is substantially closer to the central opening than the remainder of the peripheral portion. Consequently, when the portion of narrower width engages the stem of valve 38, the valve remains in closed position, but when the portion of greater width moves into register with said stem, the valve moves to open position.

In order to permit variation of these operating intervals, the plates 43a and 43b are slotted as indicated at 47a and 47b, and the two plates are bolted together through said slotted portions as indicated at 48. To change from one operating interval to another, it is only necessary to loosen the nuts and move the bolts 48 to different positions in slots 47. The relative movement of plate member 43a on shaft 45 in this action serves to increase or decrease the length of the portion of greater width of the assembly. In this way, a shorter or longer valve actuating interval is provided.

In the operation of this embodiment of the invention, pulp again is fed through pipe 10 into feed box 8 and overflows weir 9 to form a pool in compartment 14 of container 6. Vibrating mechanism 31 is operated at high speed and subjects the container 6 to an oscillating movement at right angles to the resistance porvided by rods 34. As a consequence, the filter medium 16 and the cake supported thereon are subjected to a high frequency vibration in which the cake is intermittently moved away from the filter medium surface.

Again in this action, the jarring of the cake serves to squeeze out moisture which deposits on the surface of the screen or other medium, and is periodically removed by the vacuum influence in the cyclic operation of mechanism 37.

The vibratory action is of sufficient intensity to induce a progressive movement of the cake from the pool to discharge chute 12 from which it deposits into hopper 13 in an essentially dry condition.

If fluctuations in volume of feed or changes in the composition of the material fed across weir 9 require a different degree of vacuum in order to obtain maximum moisture removal, the cams 43 and 44 can be adjusted to accommodate such changed conditions and the operation resumed at the new actuating cycle.

From the foregoing, it will be apparent that this embodiment also provides for application of variable degrees of vacuum to the solids body subjected to the vibratory influences.

The embodiment of the invention illustrated in Figures 4 and 5 combines the liquid withdrawal arrangement of the embodiment illustrated in Figure 3, with vibratory mechanism of the type illustrated in Figure 2. The container in this form is shown as disposed in a substantially horizontal position, it being understood that with respect to all the structural embodiments, the filter surface may be disposed horizontally or upwardly inclined from feed end to discharge end, or downwardly inclined from feed end to discharge end.

Likewise, in all such forms, various filter media may be employed. While the preferred construction involves the use of fine mesh cloth on a coarser wire screen, as will be described with particular reference to Figure 5, it will be understood that any type of commercial filtering media may be substituted for the screen cloth.

As illustrated in Figure 4, the container 6 is supported near its corners by suspension rods 7 connected with a suitable overhead support (not shown), and the interior of the container is divided by a filter medium 16 into an upper separation compartment 14 and a lower vacuum compartment 15b.

Feed to the container is delivered through a pipe 10 and feed box 8 across an overflow weir 9 and instead of forming the usual pool the liquid of the feed spreads across the filter medium surface 16 for a substantial distance until it is drawn through and out of the cake as it approaches discharge spout 12.

Again in this type of operation, the filter cake itself after forming as an essentially solids body functions as a filtering medium and consequently fine particles which otherwise might pass through the filter medium 16 are entrapped in the cake and passed from the treatment across discharge chute 12.

The wet body deposited onto filter medium 16 is subjected to intermittent vacuum influences throughout its travel from weir 9 to discharge chute 12 and the actuating interval of the vacuum in the operational cycle is of sufficient duration to insure complete drying of the cake although the off condition in the operational cycle permits movement of the cake from the filter medium surface in response to the circular throw of the vibratory mechanism.

The action of such mechanism involving rotation of massive shaft 17, provided with eccentric portions 17a journaled in bearings 65, and balance wheels 18 is the same as that hereinbefore described with reference to Figures 1 and 2.

Thus it will be seen that an effective dewatering action is provided and the degree of vacuum influences to which the solids are subjected is subject to variation through the provision of control mechanism 37, the details of which have been described with reference to the embodiment of the invention illustrated in Figure 3.

With this understanding of the operational variations that may be employed within the spirit and scope of the invention, reference will be made next to Figure 5 illustrating details of the filter medium assembly which provides the rigid deck which may be vibrated as a unit without setting up secondary vibrations and harmonics that impede or prevent uniform travel.

Coarse wire screen of the desired size for use in container 6 together with a series of I-beams 24 or the like are passed through rolls to produce a correspondingly cambered effect. After this action the screen 23 may be substantially flattened by passing it through flattening rolls.

After being so rolled, the screen is laid across a series of the beams 24 and welded to the same at intervals along the lengths of the beams to produce a unitary structure of the type illustrated in Figures 4 and 5. This unit is next installed in container 6 by inserting the ends of bars 24 under the overhanging portions of angle irons 50 extending lengthwise through container 6 and rigidly secured to the sides thereof by welding.

After being fitted in place the beams 24 are welded to the angle members 50 thus providing a rigid assembly. When so positioned, the edges of screen 23 abut against the protruding flange of angle iron 50 and this serves to position the upper surface of screen 23 in substantial alinement with the top surface of said protruding angle portions.

A filter cloth of extremely fine mesh is drawn to taut condition about two lengthwise extending rods 51, and after being drawn across said bars the loose ends of cloth 25 are looped as indicated at 52 in Figure 5 with the contacting surfaces of the loop stitched together. The clamping member 53 preferably in the form of a U-beam is placed against the side walls of container 6 with one of its flanged portions pressing against the looped part 52 of cloth 25 that bears against rods 51. Clamping member 53 is drawn tight against cloth 25 to tension the same by bolts 54 bearing against clamping members 55 located on the outer side walls of container 6.

This arrangement provides the necessary tensioning for the cloth 25 functioning as the filter medium in this embodiment and the looped arrangement hereinbefore described has a cushioning effect in the clamping action which prevents excessive deformation and early destruction of the cloth.

While this method of producing the filter medium and its assembly in the vacuum filter has been specifically described with reference to Figures 4 and 5 only, it will be understood that this feature is a preferred arrangement of all the embodiments shown herein.

It will be apparent from the foregoing description that various arrangements of parts may be employed to satisfy manufacturing or other requirements, and a variety of installations may be utilized according to the available space and other requirements of a given operation.

In all of these, the novel features of the present operation are utilized and the liquid is separated from the solids efficiently and at low cost despite the relatively large volume of material that may be treated.

The various modifications in structure or substitution of parts specifically described herein are not intended as a limitation of the invention, the scope of which is to be measured by the hereunto appended claims.

What I claim and desire to secure by Letters Patent is:

1. A vacuum filtering apparatus comprising a box-like container suspended from a stationary support for vibratory movement having a feed inlet and a solids discharge outlet, a filter medium dividing the container into an upper separation compartment and a lower, closed, filtrate-collection chamber, said medium being adapted to receive material from said feed inlet on its upper surface, a high frequency vibrator arranged to move the container, inclusive of said medium, along a substantially circular path lying in a vertical plane, comprising a rotatable shaft positioned transversely to the path between said inlet and said outlet journalled in eccentric bearings which are connected to said container, means connected to said filtrate-collection chamber for applying a varied vacuum to the undersurface of said filter medium which comprises partitions within said filtrate-collection chamber, dividing the chamber into a plurality of separate compartments spaced between said inlet and outlet, a separate fluid outlet conduit from each compartment connected to a vacuum source, and valve means in each conduit for controlling the flow of fluid through the conduit whereby said filter medium may be subjected to gradations of pressure from the inlet end to the outlet end.

2. A vacuum filtering apparatus comprising a box-like container suspended from a stationary support for vibratory movement having a feed inlet and a solids discharge outlet, a filter medium dividing the container into an upper separation compartment and a lower, closed, filtrate-collection chamber, said medium being adapted to receive material from said feed inlet on its upper surface, a high-frequency vibrator arranged to move the container, inclusive of said medium, along a substantially circular path lying in a vertical plane, comprising a rotatable shaft positioned transversely to the path between said inlet and said outlet journalled in eccentric bearings which are connected to said container, and means connected to said filtrate-collection chamber for applying a varied vacuum to the undersurface of said filter medium which comprises a plurality of valves, driven cams for periodically operating said valves, separate low pressure sources, each of said separate valves being connected to the outlet of said filtrate-collection chamber and adapted for connection to separate low pressure sources, whereby said chamber may be alternately subjected to varied vacuum by intermittent openings of said valves.

3. Apparatus as claimed in claim 1, wherein said inlet comprises a feed box communicating with the interior of said container through an overflow weir located a substantial distance above the bottom of said feed box.

LELAND H. LOGUE.

REFERENCES CITED

The following references are of record in the file of this patent:

UNITED STATES PATENTS

| Number | Name | Date |
| --- | --- | --- |
| 270,304 | Graves | Jan. 9, 1883 |
| 502,014 | Prangey | July 25, 1893 |
| 935,359 | Diver | Sep. 28, 1909 |
| 1,021,248 | Gross et al. | Mar. 26, 1912 |
| 1,165,068 | Butters | Dec. 21, 1915 |
| 1,595,344 | Lomax | Aug. 10, 1926 |
| 1,688,630 | Mueller | Oct. 23, 1928 |
| 2,039,573 | Weber | May 5, 1936 |
| 2,089,548 | Frantz et al. | Aug. 10, 1937 |
| 2,101,042 | Casey | Dec. 7, 1937 |
| 2,118,491 | Chuse | May 24, 1938 |
| 2,154,719 | Berry | Apr. 18, 1939 |
| 2,183,896 | Rupp et al. | Dec. 19, 1939 |
| 2,246,483 | Dillon | June 17, 1941 |
| 2,271,662 | Rubissow | Feb. 3, 1942 |
| 2,274,654 | Berry | Mar. 3, 1942 |
| 2,329,295 | Reagan | Sep. 14, 1943 |

FOREIGN PATENTS

| Number | Country | Date |
| --- | --- | --- |
| 25,296 | Great Britain | 1898 |
| 260,329 | Great Britain | Oct. 20, 1926 |
| 289,842 | Germany | Jan. 21, 1916 |
| 437,892 | Great Britain | Nov. 7, 1935 |